United States Patent
Pignol

(10) Patent No.: US 7,024,594 B2
(45) Date of Patent: Apr. 4, 2006

(54) SOFTWARE SYSTEM TOLERATING TRANSIENT ERRORS AND CONTROL PROCESS IN SUCH A SYSTEM

(75) Inventor: Michel Pignol, Toulouse (FR)

(73) Assignee: Centre National d'Etudes Spatiales, Paris (FR)

( * ) Notice: Subject to any disclaimer, the term of this patent is extended or adjusted under 35 U.S.C. 154(b) by 308 days.

(21) Appl. No.: 10/168,411

(22) PCT Filed: Dec. 21, 2000

(86) PCT No.: PCT/FR00/03640

§ 371 (c)(1),
(2), (4) Date: Nov. 25, 2002

(87) PCT Pub. No.: WO01/46805

PCT Pub. Date: Jun. 28, 2001

(65) Prior Publication Data

US 2003/0135790 A1    Jul. 17, 2003

(30) Foreign Application Priority Data

Dec. 22, 1999   (FR) .................................. 99 16227

(51) Int. Cl.
    *G06F 11/00* (2006.01)
(52) U.S. Cl. .......................................... 714/54; 714/11
(58) Field of Classification Search .................. 714/54,
    714/11, 2, 6, 13, 15, 26, 47, 48, 12, 27, 39;
    709/223, 224, 248
    See application file for complete search history.

(56) References Cited

U.S. PATENT DOCUMENTS

| 4,541,094 | A |   | 9/1985 | Stiffler ........................ 371/68 |
|---|---|---|---|---|
| 4,907,228 | A | * | 3/1990 | Bruckert et al. ............... 714/11 |
| 5,099,485 | A | * | 3/1992 | Bruckert et al. ............... 714/11 |
| 5,600,784 | A | * | 2/1997 | Bissett et al. .................. 714/12 |
| 5,664,093 | A | * | 9/1997 | Barnett et al. ................. 714/31 |
| 5,778,206 | A |   | 7/1998 | Pain et al. .................... 395/309 |
| 5,790,397 | A |   | 8/1998 | Bissett et al. ............... 364/131 |
| 5,914,953 | A | * | 6/1999 | Krause et al. .............. 370/392 |
| 6,233,702 | B1 | * | 5/2001 | Horst et al. .................... 714/48 |
| 6,263,452 | B1 | * | 7/2001 | Jewett et al. .................. 714/9 |

FOREIGN PATENT DOCUMENTS

EP    0 440 312 A2    6/1986

* cited by examiner

*Primary Examiner*—Nadeem Iqbal
(74) *Attorney, Agent, or Firm*—Thelen Reid & Priest LLP

(57) ABSTRACT

The present invention concerns a software system that tolerates transient errors made up by a processing unit, including:
  at least two processing units (50, 51) with each one including:
  a microprocessor (54, 57),
  a memory (53, 56) protected by a device generating and controlling a code for the detection and correction of errors,
  a device (55, 58) for monitoring memory accesses,
  A centralized control device (52) for the processing units and for inputs/outputs, including:
  macro-synchronization means,
  data comparison/vote means,
  correction demand means,
  decision-making means,
  means allowing the inputs/outputs to be made.
  Some links (60, 61) respectively linking each processing unit to the device (52) for controlling the processing units and the inputs/outputs.

13 Claims, 6 Drawing Sheets

SOFTWARE SYSTEM TOLERATING TRANSIENT ERRORS AND CONTROL PROCESS IN SUCH A SYSTEM

TECHNICAL FIELD

The present invention concerns a computer system tolerating transient errors and a control procedure in such a system.

The field for the invention is that of computer architectures subject to hostile environments for electronic components (radiation, electromagnetic interference) liable to cause transient errors, for example, in the fields:
- space, nuclear and aeronautical industries, where the environment is made up by, amongst others, heavy ions.
- car industry, subject to a severe electromagnetic environment.

PREVIOUS STATE OF THE ART

In the remainder of the description, the example of the space domain is used, which is highly representative of the transient errors generated randomly in electronic components.

The designers of computer architectures for satellites are faced with the problem of the different types of radiation that exist in space. One of the effects of these radiations is called "upset" or "Single Event Upset", corresponding to one or several temporary changes of states for bits in electronic components such as memories. The errors caused by the single events may lead to the creation of faulty data (e.g., bad command from a satellite actuator) or a serious disturbance of the sequencing in the software (i.e., microprocessor crash).

Till now, the solution for errors of the single event kind lay in the use of technologies for integrated circuits with low sensitivity to this phenomenon (called "radiation resistant"), even insensitive (called "radiation hardened"). Such technologies are not used by the micro-electronics industry and consequently they have been developed specifically for military and space applications.

The overall cost associated with the existence of such micro-electronic technologies and of the development of components for the latter (development, maintenance, ongoing evolution in performance levels), and then the sale cost of these components is very high (the development of a new micro-electronic throat may amount to almost 1 Billion Francs; the cost of purchasing a radiation-resistant or hardened micro-processor amounts to tens of thousands of Francs, whilst its commercial version is several thousand Francs; the hardened/commercial ratio may be 100/1 or more).

The American Ministry for Defence has put a stop to the use of military electronic components for its applications, and has accelerated the process for purchase by military activities of commercial specifications/standards/components.

The share of the military components market, called "high fidelity", has dropped sharply, from 80% on the 1960s to less than 1% in 1995 (heavy increase in the use of electronic components by industry, reduction in military markets); to the point that these components could soon be forced to disappear (some large military components manufacturers have pulled out of this market which is becoming less and less buoyant).

The possibility of using commercial components in space applications is a problem that is faced by any newly created project. The use of this type of components in the space industry is expected to provide the following advantages:
- Solution of the problem of the drop recorded in the supply of "high fidelity" components, as a result of the withdrawal from this market by the major suppliers,
- Reduction in the costs: the "high fidelity components" set is not negligible within the total cost for developing any equipment, and becomes the dominant factor in its recurrent cost. The weight of the components is however high variable depending on the target taken into account (platform, live load, equipment, level of recurrence, etc . . . ).
- Use of functions/components with better performance, allowing the volume of electronics to be cut (optimisation of the mass/consumption/reliability) and/or increasing the functionality.
- Cut in the duration for developing projects to offer more reactive access to space, with the supply time for "high fidelity" components currently being one or two years.

Nonetheless, one major problem facing the computer architectures designer is the sensitivity of these components to radiations, and in particular heavy ions. This matter, which used to be dealt with on the "component" level (resistant or hardened technologies), must now be resolved on the "architecture" and "system" level.

Satellites, and therefore their electronics on board, are subject to an environment with radiation, made up by different particles (electrons, heavy ions, protons), which are unknown by the systems used on the ground because these particles are filtered out by the atmosphere.

The source of these particles may be classified into four components, which may be linked to one another:
- Cosmic radiation of a partly extra-galactic and partly galactic origin, made up by extremely powerful ions,
- the radiation belts around the earth made up by trapped electrons and protons produced as a result of the interactions between the earth's atmosphere and solar particles,
- the solar eruptions which send out protons or heavy ions,
- the solar wind produced by the evaporation of the crown plasma, allowing low energy protons and ions to escape from the sun's gravitational pull.

These energy particles, when crashing into and passing through an electronic component, transfer part of their energy to it, which will disturb the proper working of the latter. In the present description, the single event upsets are dealt with which are created by heavy ions and protons.

These single event upsets correspond to the generation of bit errors in the cells which memorise the binary values, i.e., the memory cells, the records and the basic trigger circuits: a value '0' memorised by a memory cell will be transformed into a value '1' or viceversa. As a general rule, a single bit is modified by one heavy ion. These events are not destructive and a new data may be written subsequently, which is memorised without any error (apart from the appearance of another single event in the same cell). The errors caused by these phenomena are therefore transient.

In order to be able to use commercial components in the space industry on a large scale, a first possible solution is to select some commercial components using a systematic test under radiation, because some may be naturally insensitive to radiations (or at least to some of their effects). Such a solution, not only very costly in terms of the selection, is only a stopgap, because obligatorily it does not allow the major industry standards to be used if the latter prove to be sensitive to radiations, which is however desirable. A second solution is to find a method allowing the phenomena caused by these radiations to be tolerated, in particular the transient errors, that is to say, define architectures allowing the errors to be detected, then correct them. The act of taking into account the transient errors is then transferred from the "component" level to the "architecture" and "system" levels. This solution is preferred from the invention because it is economically more profitable and allows the restraints on the choices of the components to be reduced.

The field of tolerance to breakdowns and faults has been the subject of numerous research articles and certain mechanisms are widely used in ground-based systems, for example, in order to tolerate the breakdown of a component (e.g., secure systems).

Numerous mechanisms for the detection, isolation and recovery of faults are well known to the expert. Some mechanisms simply allow errors to be detected, others to detect them and even correct them. Furthermore, these mechanisms have been adapted for processing either temporary errors, or complete breakdowns, or both:

Prevention of faults: systematic refreshing of static data before their effective use (e.g., configuration records); autotests outside of nominal functioning ("off-line") allowing a component failure to be detected before the latter is used.

Detection codes or detectors/correctors for errors which are applied to memories, communications and possibly to the logic (basically in the building of specific integrated circuits (ASIC) or user-programmable logic circuits (FPGA) called "with integrated control". Error detection and correction (EDAC) devices are systematically used in space on the memory plans. A scan function (systematic rereading of the whole memory plan) is associated to these devices and is executed as a background task so as to prevent the accumulation of dormant errors which, in the long term, could corrupt the detection/correction capacities of the code.

Duplication and comparison, or triplication and majority vote, known in English as NMR ("N Modular Redundancy") or the case specific TMR ("Triple Modular Redundancy"): these mechanisms allow fail safe architectures to be obtained which do not produce a bad command but which stop at the first fault (duplex), or architectures that remain operational at the time of a breakdown ("fail operational") which have the capacity to mask a single error in real time and to carry on whilst remaining secure (triplex). This kind of architecture has been used in the studies on secure functioning calculators for the European space capsules, as described in the document referenced [4] at the end of the description. Master/checker architectures are also to be found in this class in which only the microprocessors are duplicated, with the data produced by the "master" being verified by the "checker". The ERC-32 microprocessor from the company TEMIC/THS carries this mechanism, as described in the document referenced [5].

Multiple programming ("N-version programming") associated with NMR architectures, which also allows software design errors to be detected because each calculator has a software version which has been specifically developed based on a common specification.

Temporary redundancy: it involves either executing twice and comparing, or executing once, loading a command record then rereading it in order to compare it so as to be able to validate it, one such "arm and fire" mechanism is used in the space industry for highly critical commands (for example, triggering pyrotechnic elements).

Execution time control: "watch timers" are used in all space calculators (a programme must be executed in a limited time). Furthermore, finer controls for the execution time may be added to the software (control of the duration for a task, maximum duration authorised for obtaining a response from a communications element, etc . . . ). The resetting of the watch may be subject to a specific sequencing of keys (used in the car industry).

Flow control check (e.g., control of the sequencing for a microprocessor): watchs allow an unrefined control (detection of a hard crash). A refined control of the instruction flow is possible with a more or less complex watch process. Signature analysis control is particularly effective and not very demanding in terms of electronics.

Addressing validation control for a microprocessor based on access rights by pages/segments.

Plausibility control: this principle is used in satellite bearing and orbit control systems in which the data from several types of sensors are compared to detect possible anomalies, either a piece of data with respect to an estimated reference thanks to a prediction filter based on previous readings, or a piece of data with respect to a predefined membership range. The so-called "Algorithm Based Fault Tolerance" methods represent a subclass of the plausibility controls, with the verification being based on the execution of a second algorithm (for example, the inverse algorithm which allows the initial data to be found again by starting off from the results obtained if the latter are error-free).

Structural or semantic data control, requiring relatively complex data structures.

Complementary concepts of error overlapping, for the mechanisms that do not allow faults to be corrected, mainly the restart points: regular saving of contexts and restart based on the last context saved. The development of the COPRA calculator (1980), as described in the documents referenced [1] to [3] is based on this principle.

Reinsertion of the faulty resource by transfusion of a healthy context in the faulty calculator, in order to find the initial detection/correction capacity again for certain architectures. A reinsertion of the faulty strings in a calculator may be performed by the operator during the non-critical flight phases.

The "master/checker" type architecture consists of duplicating only the microprocessor, synchronising both microprocessors instruction by instruction and systematically comparing their buses at each memory access (instructions and data). Certain microprocessors integrate the synchronisation mechanism directly on the chip as well as the bus comparators: for example, the IBM RH6000, Intel i960, Intel Pentium, TEMIC/MHS ERC-32 microprocessors, as described in the referenced document [5].

Thus the synoptic illustrated in FIG. 1 includes:
a master 1 microprocessor including:
a microprocessor core CM,
a clock generator GH,
a clock synchroniser SH,
a configuration record RC,
a bus comparator CMP,
some single or two directional insulators,
a checker 2 microprocessor including the same elements:

a microprocessor core CM,
a clock generator GH,
a clock synchroniser SH,
a configuration record RC,
a bus comparator CMP,
some single or two directional insulators,
a memory 3.

The signals C, A and D are respectively internal buses for control, address and data.

The clocks H and Hi are, respectively, and for example, at frequencies 10 MHz and 100 MHz.

On FIG. 1 the shaded elements are specific to the "master/checker" architecture, the barred signals are inactive or inhibited signals.

The microprocessor integrates the following elements that are specific to the "master/checker" architecture:
- a RC record which allows one of the two microprocessors to be configured as the "master" and the other one as the "Checker".
- a synchronisation of the Hi internal clocks in both microprocessors,
- some CMP bus comparators,
- a logic allowing the bus insulations to be positioned in input or in output depending on the type of access in reading or writing, and also depending on the configuration as "master" or as "checker" for the microprocessor.

As shown on FIGS. 2A and 2B which represent, respectively, the writing phase and the reading phase for the memory, the functioning is the following: the two microprocessors 1 and 2 read and execute the same instructions at the same time. At the time of each access in writing in the memory, both microprocessor cores CM generate an address and a data. The bus insulations in master microprocessor 1 are facing the output, whilst those for the checker microprocessor 2 are facing the input and the bus comparators from the latter compare bit by bit the readings supplied by the two microprocessor cores MC. In the event of an anomaly, the checker microprocessor 2 generates an error signal. At the time of each access for reading in the memory, the address supplied by the master microprocessor 1 is compared by the checker microprocessor 2 with the one calculated by the latter, in the event of agreement, both microprocessor 1 and 2 read the same data.

The difficulty of building this type of architecture with microprocessors which are not designed for, and which do not therefore integrate the mechanisms described above, lies in the time shifts between the internal and external clocks. In fact, the user provides the microprocessor with a clock at a relatively low frequency (in tens of MHZ), which is multiplied internally thanks to a phase locking loop, so as to obtain higher frequencies (a few hundred MHz). Two microprocessors powered by the same clock therefore function at the same frequency but have a time shift with respect to one another. The size of this time shift is random and is determined at power-up. The direct comparison of the buses is thus made impossible.

In the "master/checker" architecture, the memory is not duplicated. In the COPRA architecture, the memory is duplicated only in order to be tolerant to component failures, but the two central units use the same memory bank.

A first prior art document, the patent US 5 790 397, described two CE ("Computer Element") calculation units working in duplex mode, knowing that an input/output processor carries out the macro-synchronisation of the two calculation units, the comparison of their input/output demands, and performs these inputs/outputs. When the two calculation units want to make an input/output, they send a message describing this demand to the inputs/outputs processor. The latter macro-synchronises the two calculation units and compares the "checksum" for the two messages; if the "checksum" is not identical, the faulty calculation unit is inhibited or shut down.

A second prior art document, the article entitled "Transient fault tolerance in digital systems" by Janus Sosnoski (8207, IEEE micro, 14$^{th}$ Feb. 1994, No. 1, Los Alamitos, Calif., US), is a document that allows the problems of transient errors in digital systems to be understood, which aims to allow the optimal techniques to be selected for masking or eliminating the effects of such errors in the systems developed.

A third prior art document, the patent application EP-0 440 312, describes a duplex architecture made up by a BPSMP ("Basic Processor Subsystem Modules Primary") and a BPSMS ("Basic Processor Subsystem Modules Secondary") accessing a memory subsystem made up by different memory blocks ("memory array"). The microprocessor in each BPSM module executes the instructions memorised inside the module itself, with the two modules being synchronised and compared as soon as they access a data, with the date being memorised in the memory subsystem.

The aim of the invention process is to process the transient errors in computer architectures, for example, for satellites, with a very high rate of coverage so as to allow the use of commercial components in missions having very high restrictions on availability, and this despite their sensitivity to single event upsets induced by radiation.

DESCRIPTION OF THE INVENTION

The present invention puts forward a computer system tolerating transient errors, made up by a processing unit, characterised by the fact that it includes:
- at least two processing units, with each one including:
- one microprocessor
- a memory protected by a device generating and controlling an error detection and correction code,
- a watch device for memory access, including:
- means for segmenting the memory and for verifying the rights for accessing each segment,
- means for the specific protection of the memory segments allocated to saving the recovery context,
- means for generating a correction request signal to the control device for the processing units and input/output.
- a centralised control device for the processing units and the input/output, including:
- means for the macro-synchronisation of the processing units.
- means for comparing/voting the data generated by the processing units,
- means (signal) for requesting a correction sent out from the memory access watch devices,
- means for decision-making so as to initialise a correction phase in the event of an error and the means (signal) allowing this request to be transmitted simultaneously to all the processing units,
- means allowing the input/output to be performed,
- links for linking, respectively, each processing unit to the control device for the processing units and the input/output.

The software tasks benefit favourably from a particularly secure, specific protection thanks to the memory access watch device, which includes the means allowing:
the memory zones for each task to be differentiated,
the accesses to the memory involved in the current task to be authorised,
the accesses to the memory zones involved in other tasks to be forbidden.

The memorisation of the prior context of the software tasks benefits favourably from a particularly secure, specific protection thanks to the memory access watch device, which includes the means allowing:
this context to be memorised in a shared and centralised RAM ("Random Access Memory") type memory in each processing unit without needing a specific storage device.
to differentiate the memory zones involved in saving the context for each task,
to control each zone being used to memorise this context in a double "Old" and "New" bank,
to make the double "Old" and "New" banks work in tandem,
to swing the double banks by simply inverting and "Old" and "New" index set.
To authorise the "Old" zones in reading whilst forbidding them in writing.

This device may be used in an onboard electronic system and/or in the space field.

The present invention also puts forward a procedure to make a computer system tolerant to transient faults, made up by a processing unit, characterised by the fact that it allows:
identical software programs to be executed simultaneously on at least two processing units, in an independent and asynchronous manner, and complying with the following functioning:
the transient errors involving the memory of the processing units are detected and corrected thanks to the use of a detection and correction code stored in the memory associated to a software scanning task,
the proper functioning of the microprocessor for the processing units is checked thanks to a segmentation of the memory associated with a memory access watch which controls that the microprocessor properly provides access rights to the current segment of the memory,
the memory segments allocated to saving the recovery context are very secure thanks to a specific memory access watch, so as to ensure that a faulty microprocessor cannot generate an error in these critical zones,
a correction order is sent to the control function for the processing units and the input/output in the event of a violation of the access rights.
to centralise the following operations in the control function for the processing units and the input/output.
macro-synchronisation of the different simultaneous executions of the software,
comparison/vote of all the data generated by the different executions of the software,
reception of correction orders sent out from the memory access watch following the detection of an error,
when an error is detected whatever its source may be, the making of a decision so as to initialise a correction phase and the transmission of this order simultaneously to the different executions of the software,
performance of the inputs/outputs upon demand from the software programs,
to act as the interface between the software programs that are being executed simultaneously and the control function for the processing units and the input/output.

Favourably, there is an error confinement zone between software tasks, that is to say that a faulty microprocessor may only disturb the variables for the current task but not those from the other asks thanks to the memory segments control.

Favourably, in the event of detecting an error, a recovery is possible, even if there are only two processing units, thanks to the vote then the memorisation of the preceding context of the software tasks, and thanks to its specific protection thus allowing to guarantee that it is safe, since the said protection is secure because, even if it is memorised in a shared and centralised memory in each processing unit, it is memorised there in the zones controlled by the memory access watch device in memory zones specific to each task in a double "Old" and "New" bank working in "flip-flop", with the "flip-flop" for these two double banks being carried out by simply inverting an "Old" and "New" index set so that the current context thus becomes the preceding context, since the "Old" zones are authorised in reading to be used for input data in the tasks but forbidden in writing and so protected even in the event of the malfunction of the microprocessors.

Favourably, the error recovery, based on a restoration of the preceding context, is performed thanks to the fact that the index stating the preceding context judged to be safe, that is to say error-free, is not changed, since it systematically undergoes a "flip-flop" at the end of the period corresponding to the detection/recovery granularity when no error is detected; so the restoration is limited to a "no flip-flip" of the index stating the current/preceding context which is inherent in putting it into the old mode and therefore does not require any particular action.

Favourably, the error detection/recovery granularity is the control/command cycle for each one of the software tasks being executed on the processing units, and in which a recovery can only be performed on the faulty software task without the execution of the other tasks being affected by it.

Favourably, an error detection involves putting the microprocessor into the old mode, that is to say the prohibition of the execution in the period corresponding to the detection/recovery granularity in which the error has been detected, thus causing a "hole" in a period in the usual execution cycle.

Favourably, the comparison/vote of the context may be performed optionally in two ways:
either, the application software explicitly demands a grouped comparison/vote of the context data so as to save them only if they are judged to be healthy, that is to say, error-free, with this demand being made systematically at the end of the period corresponding to the detection/recovery granularity;
or, at the time of their calculation, the hardware memory access watch device for each processing unit detects any attempt at writing in the context zones and systematically subjects it to a comparison/vote to check its veracity.

In this procedure three levels of error confinement zones may be defined: spatial, temporal and software zones.

This procedure is regardless of the type of microprocessor chosen (a general use microprocessor, a signal processing microprocessor, a microprocessor developed specifically, etc . . . ) and the reference chosen (make, family, reference, etc . . . ) and it may be used with all commercially available microprocessors.

This procedure may be used in an onboard electronic system and/or in the space industry.

The minimisation of the developments specific to the procedure from the invention as well as the very high rate of error coverage are two attractive points for this procedure. In the hypothesis which maximises the tangible commissioning, these developments are basically:

For the software:
possible regrouping of the commands at the end of tasks (with the latter being usual in duplex architectures),
possible triggering of the approval for the context data at the end of tasks,
control of keys for the memory access watch device,
saving of the context data for the correction,
slight update of the existing software programs depending on the characteristics described above, For the hardware:
development of memory access watch functions and control of the processors and input/output.

Furthermore, the following elements are available:
the use of commercial software libraries is possible without any restriction,
the memory access watch functions and control of the processors and input/output are generic and reusable from one project to another, besides the microprocessor interface for the memory access watch device which must be adapted in the event of changing the microprocessor.

To sum up, the advantages of the procedure from the invention are the following:
limited and generic hardware developments hence reusable from one project to another,
very little software development,
low level of calculation power used by fail safe system,
minimisation of the recurrent costs with respect to other fail safe architectures thanks to a limited structural duplication,
correction mode not involving any microprocessor load, therefore no disturbance to the real time functioning of the application (that might, for example, cause difficulties for tuning),
three levels of error confinement zones may be defined: spatial, temporal and software zones.
inbuilt detection of errors in the real time program, allowing a commercial product to be used without any extra cost for the detection,
very high error coverage rate.

BRIEF DESCRIPTION OF THE PLANS

DETAILED DESCRIPTION OF THE EMBODIMENTS

In a certain number of space missions, a very high level of calculator availability is required. This is particularly true in the field of telecommunications satellites in which the penalties for a lack of availability are excessively high: a few interruptions in transmission during peak call hours may cost the satellite operator in penalties the equivalent of the channel lease for one year.

Furthermore, the rate of single event upsets in a calculator fully built with commercial components of course depends on hypotheses such as the number of memory cells (registers, etc . . . ) and the value taken into account for the sensitivity of a unit cell. The frequency of the single event upsets is very much lower than the frequency for the calculator' real time cycle, with this cycle corresponding to the error detection/correction granularity chosen for the invention process and may be from one to a few events per month.

The maximum hypotheses (i.e., the worst case scenarios) selected for the definition of a fail safe architecture for transient errors according to the invention are the following:
All the components in the reference architecture are commercial components.
These commercial components are not characterised by the capacity for single event upsets as the prerequisite for their use: therefore they are all deemed to be sensitive.

Figure 1:
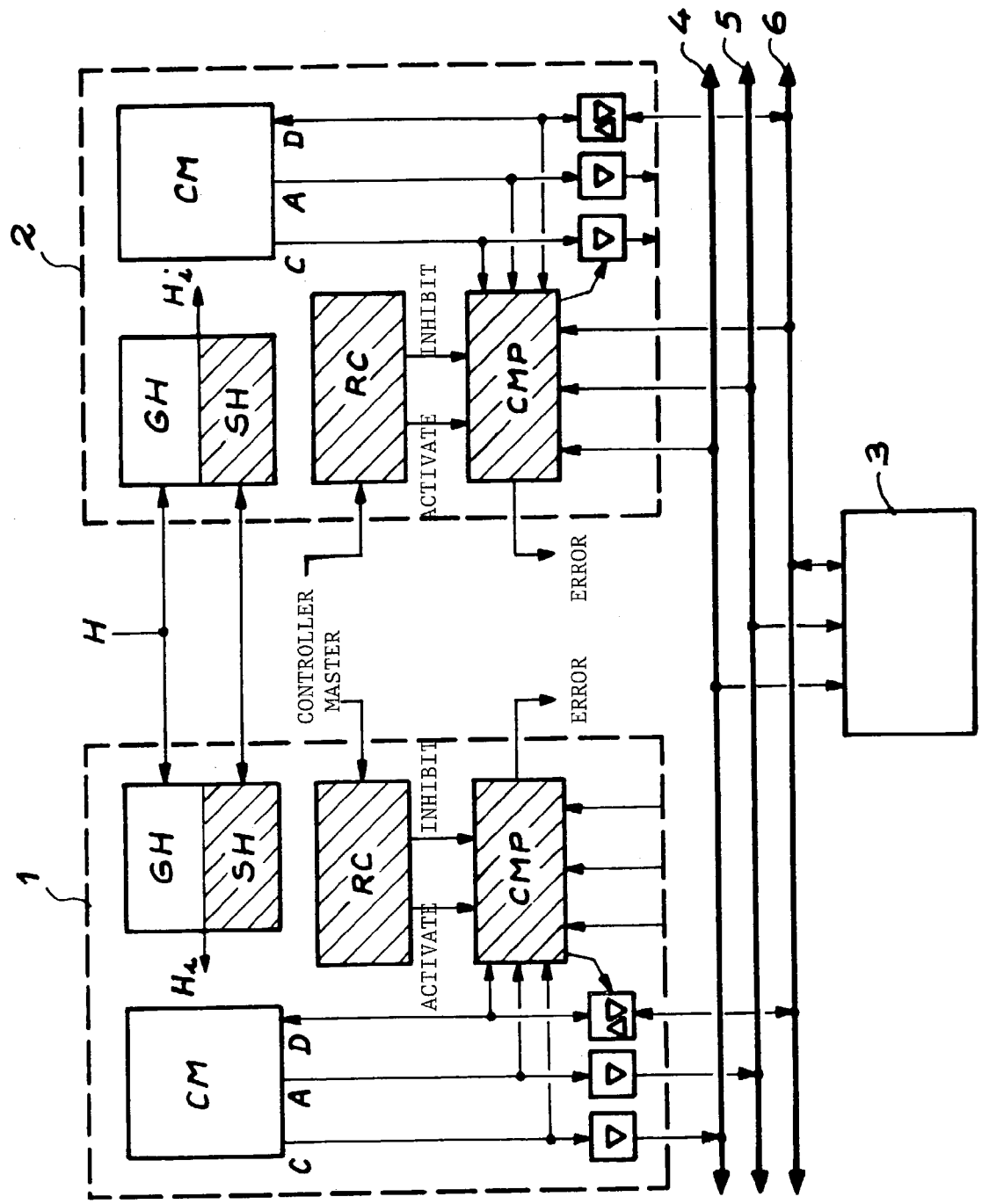
FIGS. 1 and 2 show, respectively, the synoptic and the functioning of a "master/checker" architecture.
Figure 2:
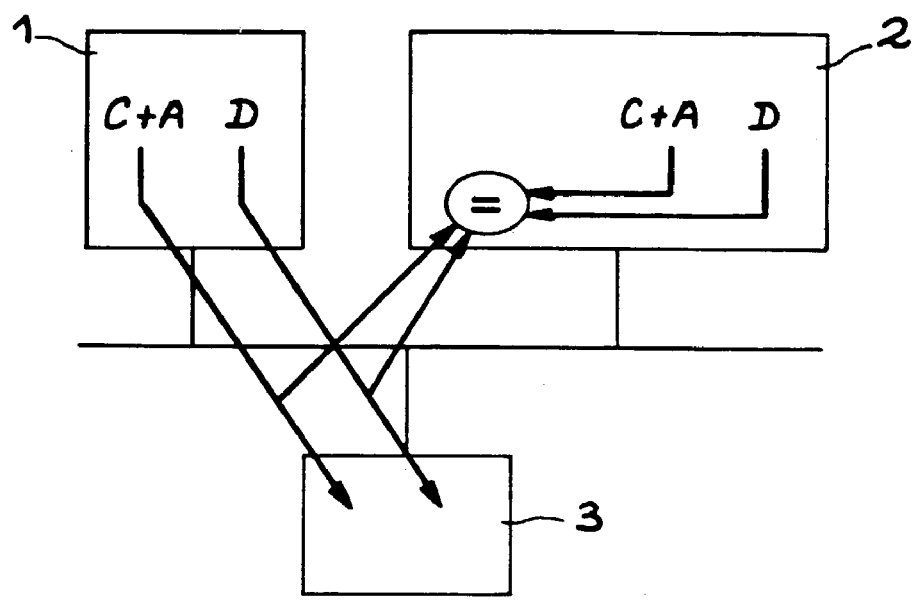
Figure 2:
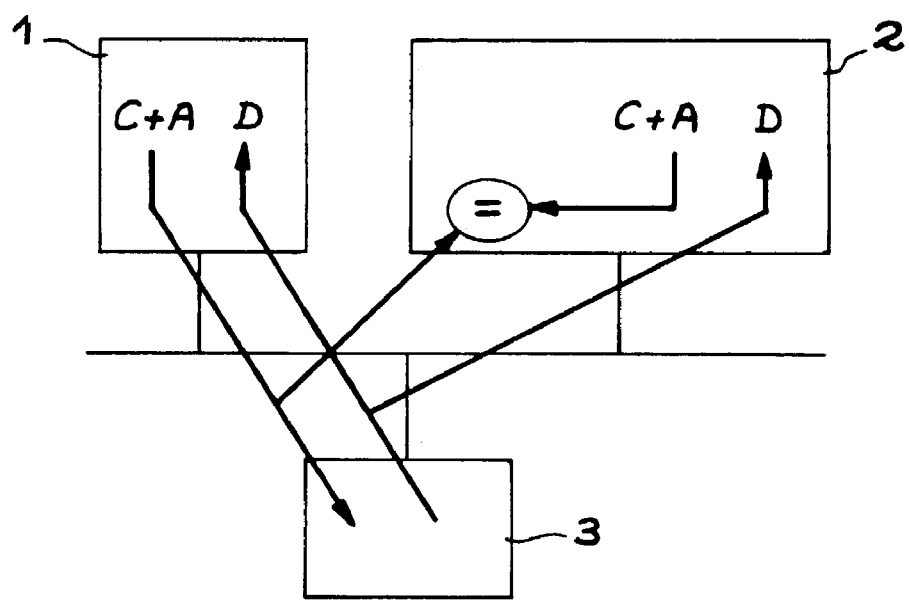
Figure 3:
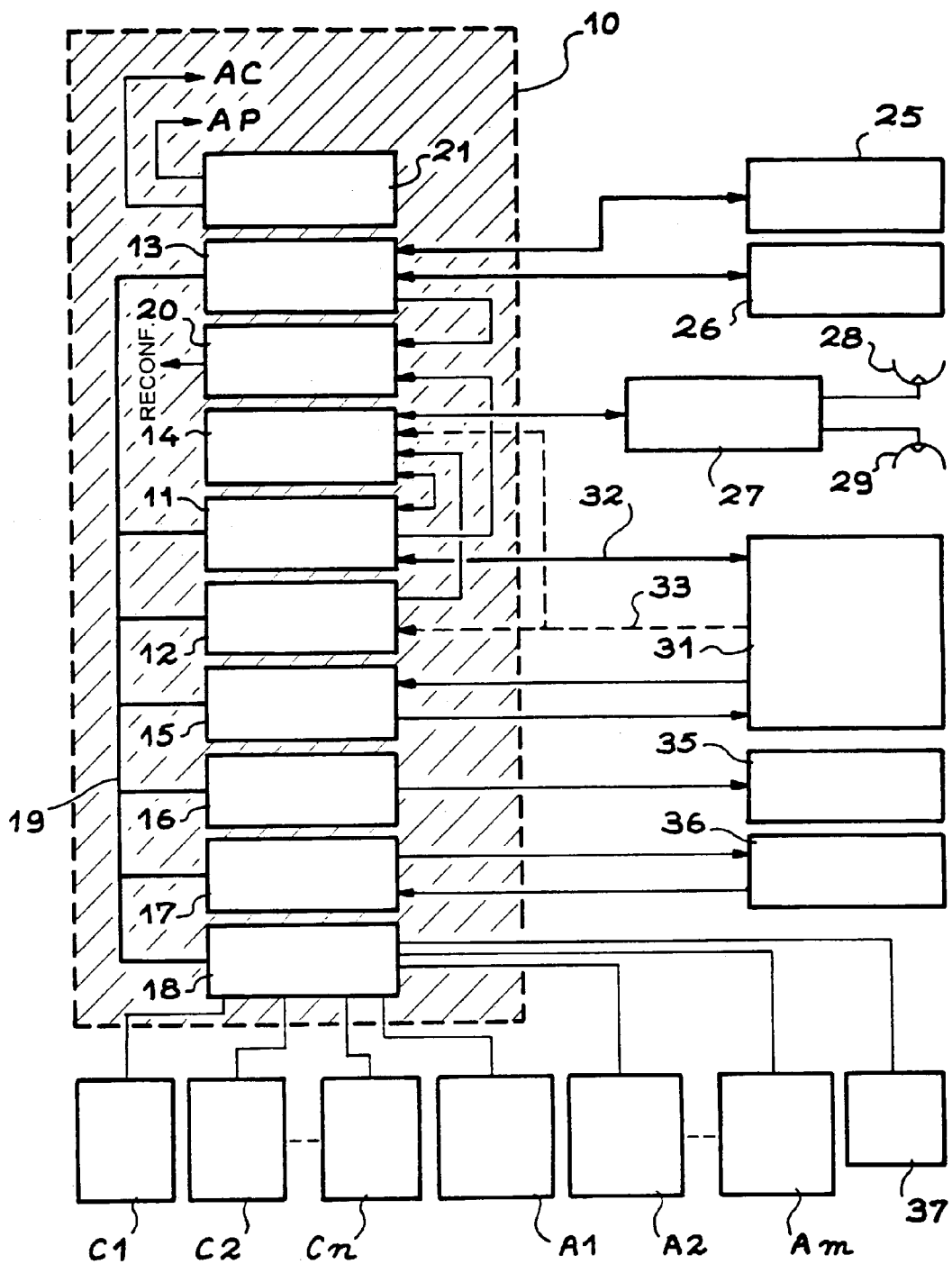
FIG. 3 shows the synoptic for a reference hardware architecture.

As the basis for the description of the invention process, the standard and generic reference architecture of a calculator used in space is considered, shown on FIG. 3.

The onboard control unit 10, illustrated on this FIG. 3, includes:
one central unit 11,
one mass memory 12,
interfaces for power 13, live load 15, pyrotechnics 16, thermal 17, bearing and orbit control 18, linked by a data bus 19,
a remote control and remote measurement interface 14
electronics for monitoring and reconfiguration 20,
continuous-continuous converters 21 delivering switched AC and permanent AP power supplies.

The power interface 13 is linked to a solar generator 25 and to a battery 26.

The remote control and remote measurement interface 14 is linked to a transmitter/receiver, duplexer 27 linked to the aerials 28 and 29.

The live load 31 is linked to the central unit 11 through an avionic bus 32, to the mass memory 12 as well as to the remote control and remote measurement interface 14, through a high flow serial link 33, and to the live load interface 15.

The pyrotechnics interface 16 is linked to some deployable systems.

The thermal interface 17 is linked to some heaters, thermistors 36.

The bearing and orbit control system 18 is linked to some sensors C1, C2, . . . Cn, some actuators A1, A2, . . . Am, and to a pressure sensor for the tanks 37.

Such an architecture is therefore made up by different processing modules (central unit module) or input/output (acquisition modules, command modules). The input/output modules (or acquisitions/commands) include low level electronics (analogue/digital or digital/analogue converter, digital or analogue path multiplexers, relays, etc . . . ).

These modules may indistinctly be cards linked by a motherboard bus or complete boxes linked by an avionic bus. In both cases, the interface to the bus may be made up by a master bus coupler (BC) on the Central Unit module, and by leased bus couplers on the other modules.

Figure 4:
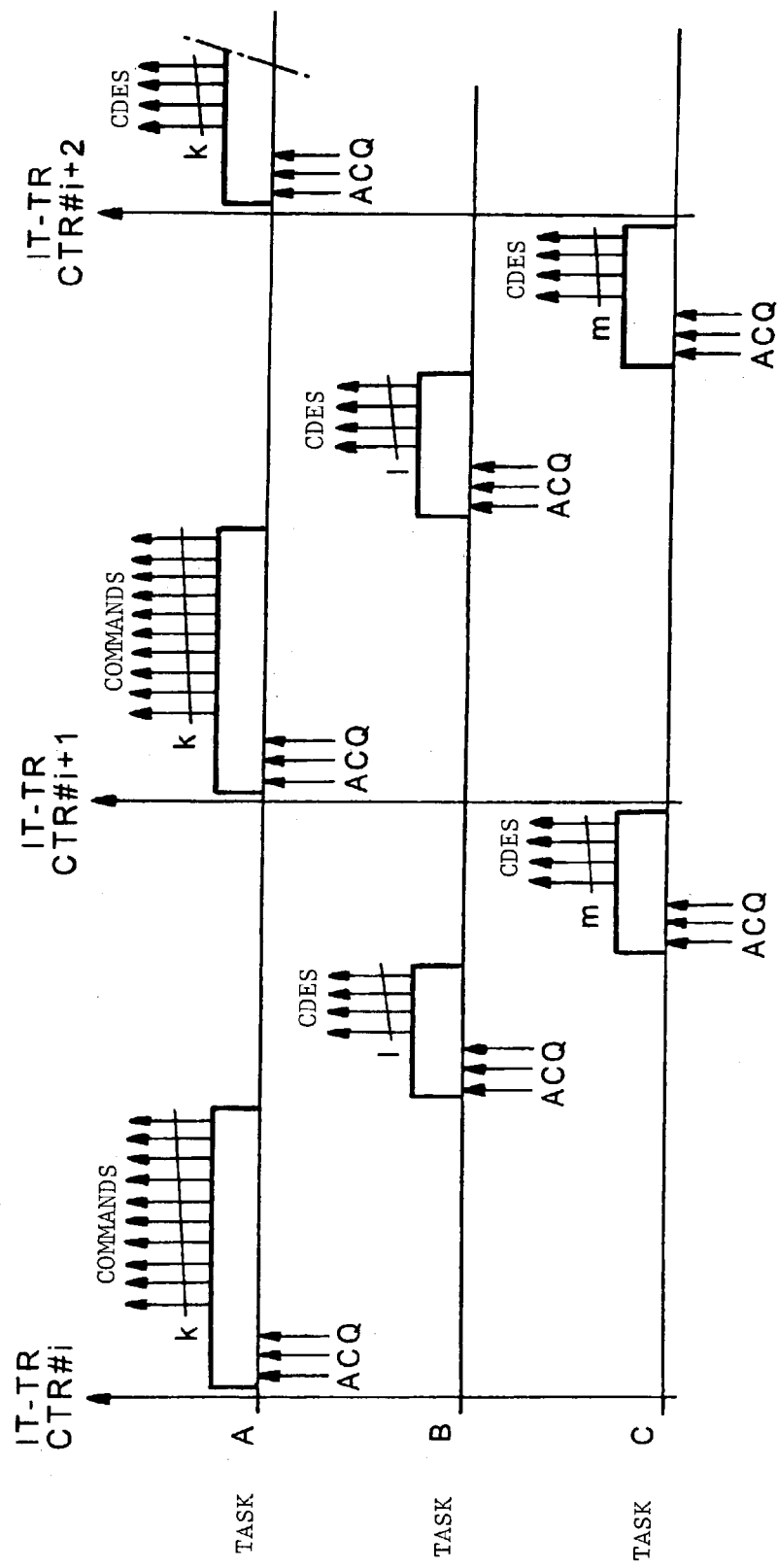
FIG. 4 shows the time chart for a reference software architecture.

The reference software architecture, as illustrated in FIG. 4, is made up by processing tasks (for example, bearing and orbit control system task, real time clock task, onboard control task, etc . . . ), with each task generating results which must come from the calculator (commands or codes), with these results being generated (i.e., once they leave the calculator) as soon as they are calculated. The acquisitions (or Acq) are grouped together at the start of the real time cycle by way of time coherence (bearing and orbit control system, for example).

On FIG. 4, the tasks A, B and C are shown at the same frequency for reasons of clarity for the description.

The activity of these tasks is rated by a real time cycle triggered by a real time IT-TR cycle switch. The cycle allows certain tasks to be started up in a cyclic manner, which work either at the frequency of the real time cycle or at a sub-frequency. Other tasks are asynchronous, and initialised on events.

Figure 5:
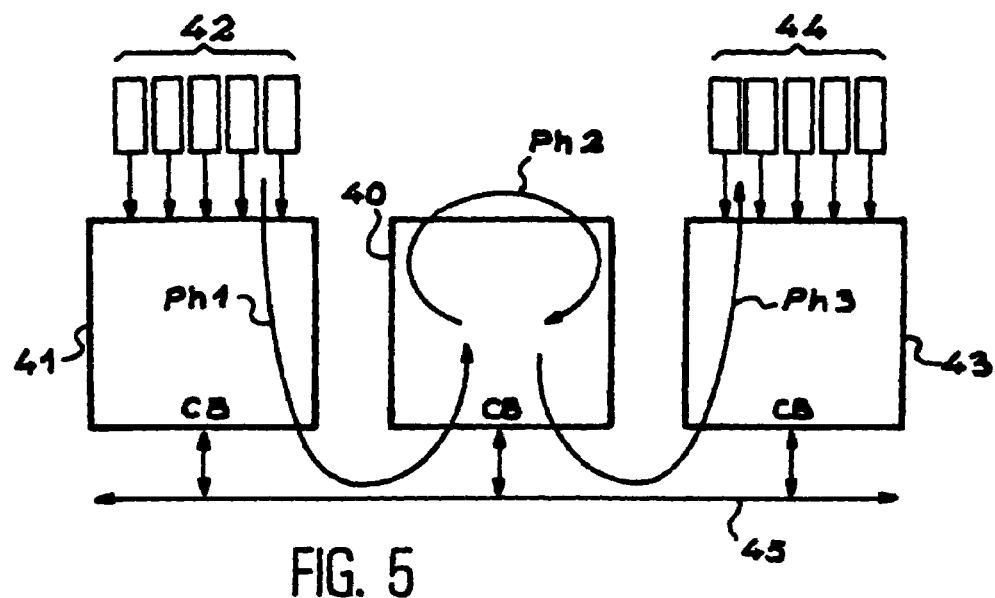
FIG. 5 shows the sequencing for the reference architecture.

A drawing showing the reference hardware and software architectures is provided in FIG. 5. The following are shown on this Figure: the central unit 40; the acquisition electronics 41 linked to the sensors 42, and the command electronics 43 linked to the actuators 44, with these two electronic devices 41 and 43, as well as the central unit being linked to a data bus 45.

The sequencing for the three main phases Ph1, Ph2 and Ph3, which are the data acquisition, their processing and the generation of commands put into play all three different parts of the electronics 40, 41, 43, with phases Ph2 and Ph3 being interlinked.

The invention process is meant to be generic and may be used in all kinds of calculators subject to transient error restrictions, whatever the source of these errors may be (cosmic radiation, electromagnetic pulses, etc . . . ).

Consequently, its description is supported by a standard reference hardware and software architecture which does not involve any particular application. The hardware side of this architecture is only based on functional blocks apart from the hardware construction (apart from the choice of components, apart from the choices of the types of integration, etc . . . ) and therefore it does not take into account the specific nature of particular components and their possible capacities in the field of error detection/correction. The procedure from the invention is therefore self-sufficient. Nonetheless, the use of possible fail safe mechanisms integrated in the components selected for a given application can only improve the error coverage rate with respect to the procedure from the invention alone.

A test of the potential error signatures in the reference architecture when subjected to single event upsets has been carried out. It has allowed the errors to be classified into two main groups:
the data errors,
the sequencing errors, which may also be split into two subgroups:
"soft crash": erroneous branch, but the microprocessor comes back into phase with the instructions and carries out a more or less erratic sequencing of the instructions:
"hard crash": the microprocessor is no longer operational: the microprocessor does not remain in phase with the instructions, the microprocessor loads the instructions record with data, the stack pointer is disturbed, there is a blockage in the sequencing of the instructions, waiting for an impossible event, infinite loop, etc . . . .

These two groups are themselves split into different subgroups, the most important of which involves the address errors.

The distinction between a "soft" and a "hard" crash is important: either a hardware mechanism external to the microprocessor is generally required for detecting "hard" crashes (e.g., a watch), or a software mechanism may be sufficient to detect a "hard" crash since, in the latter case, the microprocessor continues to execute some code, even if erratically.

Furthermore, microprocessor crashes represent one kind of critical errors, because a "mad microprocessor" is capable of actions which might have some catastrophic consequences for a mission; therefore it is important to endeavour to detect them, within a short time, and/or make some error confinement zones so as to minimise the probability of bad commands due to an undetected error.

A mechanism, or a set of mechanisms, which would directly detect any event belonging to both groups of errors above, would have a complete capacity for detection. If a direct detection of these two groups is not exhaustive enough, perhaps it might be interesting to use some mechanism specifically adapted to one or several subgroups, in particular the address errors, so as to increase the overall rate of coverage for the solution chosen.

SELECTION OF THE DETECTION/SELECTION GRANULARITY

Overall, the granularity proposed in the invention for the detection/correction us the calculator's basic real time cycle, for example, the bearing and orbit control task in a satellite platform calculator.

More exactly, the granularity is the control/command cycle for each one of the software tasks being executed on the processing units cores, but the term "real time cycle" shall be kept for the sake of simplification.

In fact, in the invention process as in a complete "classic" structural duplex, the aim is to let the calculator work without monitoring and only to approve the data which must come out of the calculator (the commands) or which are used fro the correction/recovery of errors (the context).

The choice of the real time cycle for the granularity is highly advantageous:
At this frequency most of the sensors/actuators may be accessed for acquisition or command;
At the end of the real time cycle the "active" data are available in a relatively restricted number (no multiple intermediate data or local variables that are being used):
for the detection, the "context" type data which must be approved are thus limited;
for the correction, a simple and well located recovery context is available.

The search for a very fine granularity, in particular for the correction, quickly reveals the complexity induced by the definition of the data needed and sufficient for the recovery context and in addition some intermediate votes which make the overall functioning more complex.

More precisely, the detection/correction granularity for a given task is the frequency of this task itself, since the vote is performed at the end of the task. Consequently, if a task at 10 Hz and a task at 1 Hz are considered, the granularity will be 10 Hz for the former and 1 Hz for the latter. The reasoning is identical, but for reasons of clarity, as follows the notion of "granularity by real time cycle" is kept rather than "by task".

OVERALL DESCRIPTION

Generally speaking, the "duplex" type of architecture (two identical physical strings in parallel executing the same software, with a comparison of the outputs) is particularly attractive because it allows all the errors to be detected without any exception, whatever their type may be (errors in data, addresses, sequencing, configuration, etc . . . : the drawback of such a solution lies in the weight of the structural redundancy: the mass, the volume, the consumption and also the recurrent cost of the calculator are all more than doubled, which is unacceptable for many applications.

Since the vast majority of the difficulties linked to error detection/correction are located in the microprocessor, a "master/checker" type architecture is highly attractive. However, in order to be able to use the microprocessors which do not directly include the mechanisms in the chip which authorise the micro-synchronisation of the master with the checker and the comparison of their buses, the search for another solution is required.

In order to benefit the efficiency of the duplex, whilst minimising the structural redundancy and, thus, get closer to the compactness of a "master/checker" type architecture, the procedure from the invention consists of duplicating only the microprocessor and its memory (here we talk about "processing unit core") and macro-synchronising them; the data produced by each processing unit core (e.g., commands, context) are approved before their use by a component that is external to them.

A correction consists of, following a detection, inhibiting the real time cycle under way and reloading a healthy context to carry out a restart; with the restart in fact being the nominal execution of the following cycle based on the reloaded context: everything happens as if there was a "hole" in a real time cycle (it involves a "continuation").

The invention process allows for a high error coverage rate with regards to the transient errors in the processing unit core, since these types of errors inevitably lead to a difference between the two processing unit cores.

The invention process also allows the permanent faults to be detected in either of the processing unit cores, but quite obviously without being able to correct them, so the latter have to be dealt with in the usual manner.

In any case, The invention process does not protect the actions upstream from the vote, that is to say the data transfers to the command electronics (i.e., the data bus), as well as the command electronics itself. Thus, the critical commands, which must be error-free, must be protected by classic mechanisms: data coding, error detection circuit, command electronics instrumentation, etc . . . .

The implementation of the invention process calls for two specific components; a memory access watch device and a processor and input/output control device. By design, these are protected against single event upsets by classic mechanisms: triplication of the critical records, etc . . . .

DETAILED DESCRIPTION

Main Parts

Figure 6:
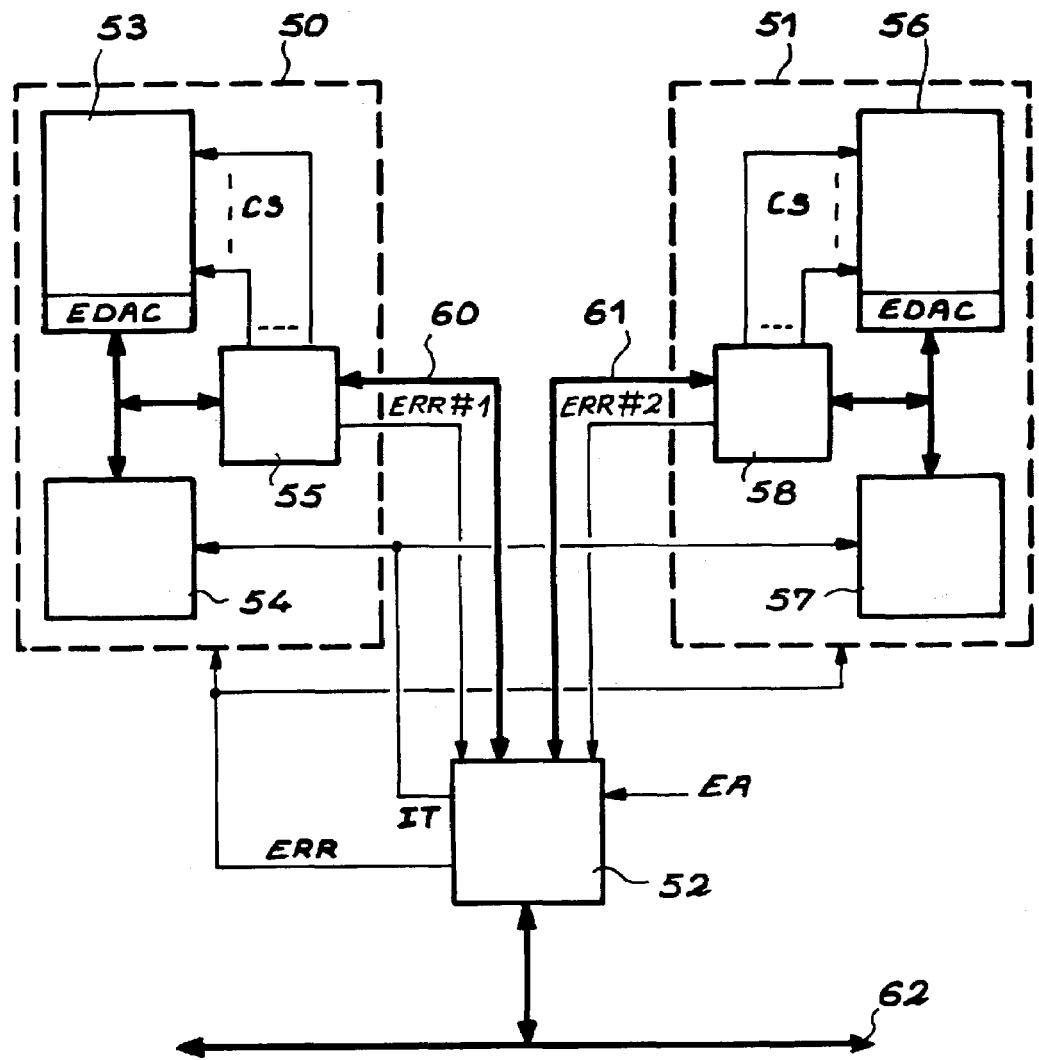
FIG. 6 shows the architecture for the system from the invention.

FIG. 6 shows the hardware architecture for the procedure from the invention.

The latter includes a first and a second processing unit core 50 and 51, which include the same elements, and a processor and input/output control device 52.

The first processing unit core includes:
a memory 53 protected by error detection and correction (EDAC) code.
a microprocessor 54,
a memory access watch device 55,
The second processing unit core includes:
a memory 56 protected by error detection and correction (EDAC) code.
a microprocessor 57,
a memory access watch device 58.

Each memory access watch device 55, 58 generates the (CS) chip select signals for the memory correspondence 53, 56.

The processor and input/output control device 52 is linked to each memory access watch device by a bus 60, 61. it is also linked to an input/output bus 62. It receives ERR#1 and ERR#2 signals from the memory access watch devices 55 and 58, and an AE (asynchronous events) signal from the outside. It delivers an IT (interruption)signal to the two microprocessors 54 and 57 and an ERR (error) signal to the two processing unit cores 50 and 51.

The inventions process is thus based around:
a structural duplication 50, 51 of the Processing Unit Core;
a component external 52 from the processing unit cores, mainly performing three functions:
the macro-synchronisation of the processing unit cores 50 and 51,
the vote of the data allowing error detection;
the input/output control,
some memory planes (53, 56) in the processing unit cores, protected against single event upsets by error detection/correction (EDAC) code.
a segmentation of the memory associated with a hardware memory access watch device (55, 58) controlling the access rights which, with the error detection/correction code allowing the recovery context to be saved in a secure manner in shared memory planes (53, 56) and to detect address errors.
a specific control of the restart context;
a correction in the event of errors:
three levels of error confinement zones.

A "majority vote" takes into account three inputs at least, and it is more appropriate to use the term "comparator" when there are only two inputs, as is the case for the procedure from the invention with two processing unit cores illustrated on FIG. 6. In the present description however the generic term "voter" is used, which is more spoken.

Structural Duplication

In the procedure from the invention, the structural duplication is limited to the processing unit core, that is to say the following elements:
the microprocessor (54, 57)
the memory (53, 56) for the microprocessor (read only and read-write memory) protected against single event upsets by error detection/correction (EDAC),
an external memory access hardware watch device (55, 58), integrating the decoding logic for the addresses and memory access watch,
unlike the "master/checker" architecture in which only the microprocessor is duplicated, and unlike the classic structural duplex in which the whole central unit board, and even the whole calculator, are duplicated.

This structural duplication of the processing unit cores allows a real time unmodified executable and identical application software programs to be used, which are executed simultaneously on the processing unit cores and shut down at the same point in the instruction flow (macro-synchronisation) to ask for an identical input/output (acquisition/command) or a vote for identical data (for example, context).

Synchronisation/Vote/Inputs-Outputs

The hardware device 52 that is external to the processing unit cores 50 and 51 for the control of the processors and inputs/outputs, includes the following functions:
 macro-synchronisation of the processing unit cores,
 vote,
 initialisation of a correction following the detection of an error,
 access to the processing unit core memories in the Direct Memory Access mode,
 control of the inputs/outputs and interface between the processing unit buses 60 and 61 in each one of the two processing unit cores and an input/output bus 62,
 Interruptions Controller (IT).

Each one of the processing unit cores 50 and 51 communicates with the processors and inputs/outputs control device 52 by means of the processing unit buses 60, 61. The inputs/outputs are controlled by the processors and inputs/outputs control device 52 through the input/output bus 62.

Macro-Synchronisation

Each one of the processing unit cores 50, 51 works independently from the other. As soon as one of the processing unit cores wishes to make an input/output, that is to say either to read an acquisition or to generate a command, the functioning is the following:
 the said processing unit core sends a message to the processors and inputs/outputs control device 52 describing its demand by means of the pertinent processing unit bus 60 or 61 (the message includes an address for an acquisition or an/address data pair for a command),
 the processors and inputs/outputs control device 52 then waits for a message on its other processing unit bus.
 If the second processing unit bus is mute at the end of a given time period, an error is decided. If not, the processors and inputs/outputs control device compares the two messages, if they are completely identical (length and contents), then the processors and inputs/outputs control device 52 makes the transfer demanded by means of the input/output bus 62.
 Once the transfer has been made, the data in the case of an acquisition is written directly in Direct Memory Access into the memory of each one of the processing unit cores by the processors and inputs/outputs control device, then the processors and inputs/outputs control device releases the processing unit cores.

Each one of the processing unit cores can then take up its processing independently again: the invention process therefore uses a macro-synchronisation limited to the vote times (inputs/outputs, context) unlike the "master/checker" architecture in which the microprocessors are micro-synchronised instruction by instruction.

The number of macro-synchronisations may be reduced by grouping together the generation of the commands, as well as the approval of the context data, at the end of the real time cycle unlike the structure of the reference software.

Vote

The vote performed by the processors and inputs/outputs control device 52 may be simple (a bit by bit vote type) or more complex (a vote type related to thresholds) following the start-up selected. In the second hypothesis, the threshold is a parameter transmitted to the voter by the processing unit cores at each input/output; the thresholds are themselves approved bit by bit before their use.

If the complex votes are in a restricted number, they may be entrusted to the application software so as to limit the complexity of the hardware voter (for example, exchange of complex data to be voted between processing unit cores through the Direct memory Access in the processors and inputs/outputs control device, then the vote by the processors and inputs/outputs control device of the result of the vote from each one of the processing unit cores).

Initialisation of a Correction

The elementary detection of errors is spread between the memory access watch devices 55 and 58 included in the processing unit cores 50 and 51 (control of the rights for memory access), and the processors and inputs/outputs control device 52: on the outside of the processing unit cores (vote).

On the other hand, the overall decision for considering that an error has just been detected is centralised in the processors and inputs/outputs control device 52: when a memory access watch device has detected an error, it reports it to the processors and inputs/outputs control device (ERR#1 or ERR#2) which then generates a single error signal ERR to the two processing unit cores so that a correction phase will be initialised by each one of them.

Direct Memory Access Controller

The processors and inputs/outputs control device 52 includes a direct memory access device for loading into the memory of the processing unit cores the data issued for acquisitions and optionally to access the context data to be voted. This direct memory access controller may also be used in the case of a processing unit bus and/or an input/output bus for block transfer.

Control of Inputs/Outputs

The processors and inputs/outputs control device 52 performs the interface between the processing unit buses 60, 61 in each one of the two processing unit cores 50, 51 and a single input/output bus 62, and controls the inputs/outputs on behalf of the processing unit cores when the latter supply an identical demand.

Controller for Interruptions

The processors and inputs/outputs control device 52 receives all the external asynchronous events AE and generates the IT interruptions simultaneously towards the two processing unit cores 50 and 51. The later are memorised in the processors and inputs/outputs control device until the release by the two processing unit cores. Each microprocessor can thus ensure that it does not involve a parasite interruption generated by a single event upset in its own internal interruption logic.

Protection for the Memory Planes

The memory planes are classically protected against single event upsets by a correction code (EDAC) and scanning task (rereading in background task for all the memory plane to detect and correct the dormant errors so as to prevent the accumulation of erroneous bits in the same word which might then no longer be detected and/or corrected by the code.

This feature is important for the invention process. In fact, it is essential to obtain a reliability level for the memorisation of the restart context data to make sure about the effectiveness of the correction.

The invention process therefore relies on a doubly protected memory plane:
- on an intrinsically reliable memory plane with regards to the single event upsets thanks to the use of an error detection and correction (EDAC) device;
- on a reliable memory plane with regards to incorrect writings following an error in address, instruction, a microprocessor crash, etc . . . , thanks to the use of an access rights watch device (memory access watch devices).

Memory Access Watch Device

Each memory access watch device 55 or 58 is a hardware device derived from the classic block memory protection units. The memory is partitioned into segments and this device allows us to check that the microprocessor seeking to access a segment indeed has the right for access.

The memory access watch device allows a large part of the address error to be detected. It allows, in particular, numerous cases of microprocessor crash to be detected rapidly, i.e., with a short delay. In fact, following a "soft" crash, a microprocessor may frequently leave the authorised addresses zone. Thus, the memory access watch device allows sequencing errors in the microprocessor to be detected very quickly, which represent a category of critical errors.

The memory access watch devices have certain specific characteristics:
- the size of the segments is any and defined according to the application;
- certain segments have a meaning and a functioning specific to the invention process, in particular those which are used to save the restart context;
- the access authorisation is carried out by programming the keys memorised in the internal registers in the memory access watch device, the definition of these keys being specific to the invention process;
- the definition of the keys is on an "application software" level and not on a "hardware" level;
- the authorisation for access to a segment is granted according to a logical combination of all or part of the keys, with the logical combinations for each one of the segments being specific to the invention in the procedure;
- The memory access watch device can trigger some specific mechanisms at the time of a reading or of a writing of a particular segment;
- a zone is affected by an application task for the software so as to dispose of a software confinement between tasks,
- a memorisation zone for the contest is affected by a task so as to protect it specifically with an "Old"/"New" flip-flop functioning.

The list of the keys integrated in the memory access watch device is provided below:
- Key for prohibiting access in writing to the zone memorising the code so as to prevent a corruption of the latter. In the opposite case, it would be necessary to systematically approve the code and reload it each time that an error is detected, which would be particularly restrictive. This key allows the writing of the memory to be authorised only at the time of the initialisation of the calculator, when the code in read-only memory must be transferred to read-write memory.
- Key indicating what the current task is, and authorising the microprocessor to only access the memory zone containing the data for the task for the software being run. This key allows a fail safe proofing against errors in a task with respect to the others.
- key indicating which ones are, amongst the sets of "Old"/ "New" zones working in flip-flop, the "Old" zones and the "New" zones, taking into account that the "Old" zones are prohibited in writing.

Functioning of the Restart Context

The memory zones involved in saving the recovery or restart context are differentiated for each task in order to limit the error recovery to the single faulty task, that is to say the current task at the time of detecting an error; so a recovery may be performed only on the software task without the execution of the other tasks being affected.

The functioning of the restart context relates to four different phases: the memorisation, the vote, the saving and the restoration.

For a correction mode of the "recovery" type, the data constituting the restart mode must be specifically protected in such a way that the restart can definitely be performed from a healthy context.

To do so, the data are memorised in specific zones of the memories in the processing unit cores (53, 56), with each zone being controlled by the memory access watch device in a double "Old" and "New" bank working in flip-flop.

Several methods may be used to perform their approval. At the end of the real time cycle, the "New" zones are approved in a grouped manner by the processors and inputs/outputs control device 52, upon demand from the application software, so as to save them only if they are deemed to be healthy. This method has the advantage of reducing the number of macro-synchronisations required for the vote of the context data.

Any attempt at writing in one of the context zones, as the real time cycle advances, is detected by the memory access watch device and systematically transmitted to the processors and inputs/outputs control device for vote. If the vote is correct, the data is effectively stored in memory in the processing unit cores by the memory access watch device.

At the end of the real time cycle, and after the vote for the first method, the current context zones are saved and flip-flopped by inverting the "Old" and "New" index: the current context has become the preceding context.

The "context restoration" function, activated at the time of an error correction, is performed thanks to the fact that the index indicating the preceding context deemed to be healthy has not changed, since it is flip-flopped in normal time when no error is detected; with this "non flip-flip" being inherent to the inhibition of the execution of the real time cycle in which the error is detected.

Recovery or Correction

Different, more or less complex correction modes may be implemented following the type of mission to be performed:
- system reinitalisation, that is to say hot reinitialisation, cold reinitialisation or passing on a redundant calculator if there is one:
- rear recovery,
- front recovery, that is to say "pure" pursuit or pursuit based on a context saved.

The last solution is preferentially selected for complex control-command systems, a solution used in the said description to describe the procedure from the invention.

The correction is executed in accordance with the following sequencing:
- when an error is detected, the current real time cycle (number N) is inhibited, no command is generated: the microprocessor passes over to the old mode ("standby") awaiting the following real time cycle;
- the following real time cycle N+1 is executed not as from the context N (which is not secure), but from the preceding context N−1 and from the acquisitions in the current cycle N+1.

In fact, the faulty real time cycle is not added. It is not a retry strictly speaking. It simply manages to inhibit the current real time cycle and restore the context from the preceding cycle. In the event of an error, the microprocessor does not generate the commands for the current real time cycle since it has gone into standby mode: everything happens as if there was a "hole" in a real time cycle.

The correction does not need any specific action: since the microprocessor has gone into standby mode after a detection, it cannot execute (or finish the execution) of the vote at the end of the current real time cycle. That naturally entails a non-swap of the "Old" and "New" contexts which is done at the end of the approval when the system state may be deemed to be healthy. The restoration or the reloading of the contexts following an error detection is therefore intrinsic to the functioning selected for the procedure from the invention.

At the time of a restart, the term "reloading of the context" is often used. Strictly speaking, to sum up, the procedure does not need any reloading, since the "Old" and "New" indexes of the context zones are not switched following an error detection: in fact, the restart consists "of not doing anything", going into standby, with the rest of the nominal functioning occurring automatically.

Furthermore, the recovery or correction may be limited to the current task thanks to the confinement between tasks and the differentiation of the restart contexts for each task; in this case, only the faulty task is aborted and loses a real time cycle in the event of a recovery by pursuit, the execution of the other tasks is not affected by it at all.

A single restart attempt is made. If it does not work, it is, for example, because the error has managed to spread to the restart context which is therefore no longer healthy, or there is a permanent fault. A complete reinitialisation of the calculator, or transfer to an emergency redundant calculator, if there is one, is then necessary.

Confinement Zones

Three confinement zones are defined in the invention process.

Figure 7:
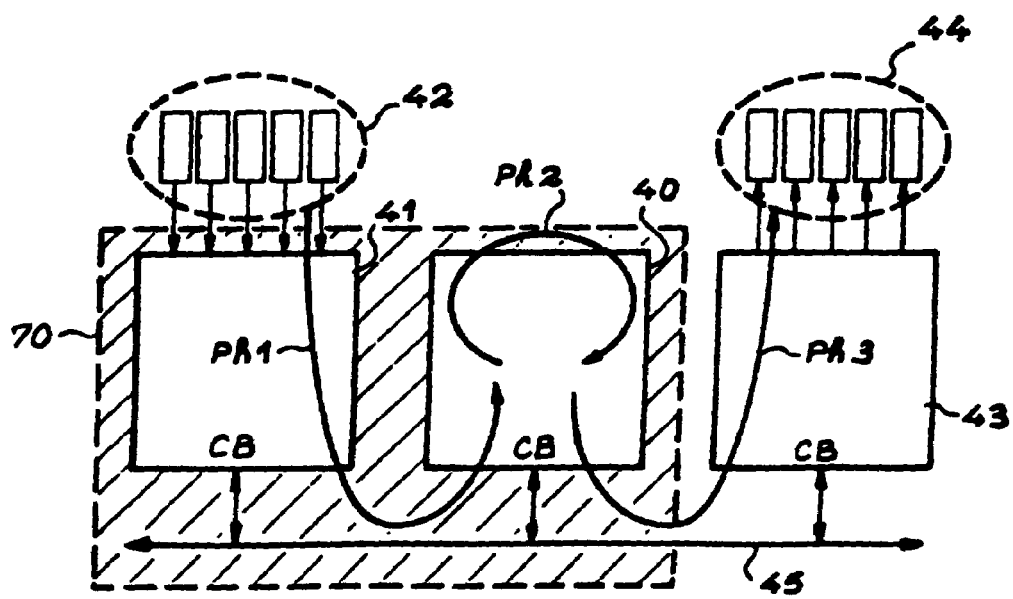
FIG. 7 shows the error confinement zone on the spatial level of the system from the invention.

The first zone corresponds to a spatial confinement. This major confinement zone for the errors 70 is made up by the acquisition electronics 41 and the central unit 40, as illustrated on FIG. 7. on this figure, the same references are used as those on FIG. 5. The acquisition electronics is protected by some classic mechanisms (for example, replication). Thus, is an error disturbs the acquisitions, or the processing (since the time allocated to the processing is by far the most important one because statistically it is in the processing phase that the most errors occur), this error cannot be generated towards the command electronics. The errors arising following a single event upset in the acquisition electronics or in the central unit cannot therefore cause bad commands for the satellite; they do not disturb the mission.

The second zone corresponds to a temporary confinement of the errors on the real time cycle level (the real time cycle which follows the appearance of an error is correct), since the correction is based on a real time cycle granularity.

The third zone corresponds to a software confinement of the errors on the software tasks level (no spread of errors from one task to another) thank to the memory access watch device.

Error Coverage Rate for the Process

The error coverage rate for a fail safe mechanism represents the percentage of errors that it is capable of processing with respect to all the errors liable to arise.

Furthermore, in the invention process, given that the spatial confinement zone is impervious to errors, there cannot be any erroneous command generated in the command electronics.

The error coverage rate, in the invention process, must be located in the range of the usual coverage rates for structural duplex, that is to say over 99%.

Variations

Some variations in the invention process are possible. Some have already been mentioned:
- Regrouping of the generation of the commands, and of the vote of the context data, at the end of the real time cycle in order to cut down the number of macro-synchronisations.
- Simple vote (bit by bit vote type) or more complex vote (vote type with respect to some thresholds).
- Processing unit bus and/or input/output bus with block transfer or not.
- Correction mode.
- Inclusion of the software mechanisms of the invention process in the real time executable so as to maximise the correction rate.

Furthermore, it is possible to share out the following functions of the processors and inputs/outputs control device in the processing unit cores and to perform them in the software at the price of a reduction in the error coverage rate:
- the macro-synchronisation,
- the vote,
- the inputs/outputs control.

The processors and inputs/outputs control device 52 for synchronisation/vote/inputs-outputs may also be removed and its functions spread out to the hardware and/or software in the processing unit cores.

Finally, it is possible to triplicate the processing unit core, possibly by simplifying or removing the memory access watch device, since the processors and inputs/outputs control device is connected to the three processing unit cores and performs a majority vote. The errors are masked in real time. A memory context must be transferred into the memory of the faulty processing unit core if the memory access watch device has been removed or if the error involves the real time executable. This transfer may be greatly reduced if the memory access watch device is kept along with the "segmentation by task" function.

REFERENCES

[1]"COPRA: a modular family of reconfigurable computers" by C. Méraud and P. Loret, (Proceedings of the IEEE national Aerospace and Electronics Conference, NAECON '78, 16–18, May 1978, Dayton, Ohio, USA:

[2] "Calculator with an automatically reconfigurable parallel organisation" by F. Browaeys, J-J. Chevreul and C.

Méraud. (Second International Conference on Reliability and Maintainability, 21–23 Sep. 1980, Trégastel, France).

[3] "A line of ultra-reliable reconfigurable calculators used for onboard aerospace applications" by C. Méraud and F. Browaeys (AGARD Conference proceedings No. 272 "Advances in Guidance and Control Systems Using Digital techniques", Guidance and Control Panel Symposium, 8–11 May 19788, Ottawa, Canada).

[4] "Fault-tolerant computer for the Automated Transfer vehicle", by R. Roques, A. Corrégé and C. Boléat, ($28^{th}$ Fault Tolerance Computing Symposium, 23–25 Jun. 1998, Munich, Germany).

[5] "Concurrent error-detection an modular fault-tolerance in a 32-bit processing core for embedded space flight applications", by J. Gaisler. ($24^{th}$ Fault Tolerance Computing Symposium, 1994).

What is claimed is:

1. A computer system adapted to process different types of faults, with a given error coverage rate, the computer system comprising:
   at least two processing unit cores, each processing unit core comprising:
      a microprocessor;
      a memory having one or more segments and protected by a device generating and controlling an error detection and correction code; and
      a memory access watch device comprising an intrinsic means for protecting itself against transient errors, comprising:
         an electronic server set adapted to control said memory;
         a means for the segmentation of said memory and verification of a right for access to each of said one or more segments of said memory;
         a means for protecting said one or more segments of said memory allocated to saving recovery context information; and
         a means for generating a correction demand signal to said at least two processing unit cores and to a control device, each of said at least one processing unit adapted to execute the same software asynchronously;
   a control device, comprising:
      a centralized electronic server set including at least one clock generator, at least one timer, and at least one watch;
      a means for receiving said correction demand signal;
      a macro-synchronization means for the at least two processing unit cores, said macro-synchronization means adapted to upon receipt of a first one or more messages from a first of said at least two processing unit cores, wait for a predetermined time for receipt of a second one or more messages from a second of said at least two processing unit cores, said first one or more messages equivalent to said second one or more messages, each processing unit core having stopped at the same point in the software to transmit said first one or more messages and said second one or more messages;
      a means for initiating a correction phase for different cases of error, said means adapted to, if said messages are different, simultaneously transmit a correction phase demand to each of said at least two processing unit cores;
      a means for executing said messages and releasing said at least two processing unit cores if said messages are identical;
      a means for direct memory access in said at least two processing unit cores; and
      a means for processing inputs and outputs; and
   one or more links linking each processing unit core to said at least two processing unit cores and said control device.

2. The system of claim 1, in which the memory access watch device comprises a means for allowing:
   one or more memory zones for each of one or more tasks to be differentiated;
   accesses to said one or more memory zones that are affected by a current task to be authorized; and
   accesses to said one or more memory zones that are involved in other tasks to be forbidden.

3. The system of claim 1, in which the memory access watch device comprises a means for allowing:
   a context to be memorized in a shared and centralized memory in said at least two processing unit cores, without needing any specific storage device;
   one or more memory zones involved in saving said context from each of one or more tasks to be differentiated;
   each of said one or more memory zones that are used for memorizing said context to be controlled in a double "Old" and "New" bank;
   making the double "Old" and "New" banks work in flip-flop;
   said double banks to be flip-flopped by inverting a set of "Old" and "New" indexes; and
   zones referenced by said "Old" indexes to be authorized in reading whilst prohibiting them in writing.

4. The system claim 1, which is used in an onboard electronic system, in the spatial field, or both.

5. A method for making a computer system tolerant to different types of faults, with a given error coverage rate, the method comprising:
   running identical software applications simultaneously on at least two processing unit cores, independently and asynchronously, each of said at least two processing unit cores having a memory having one or more segments, a microprocessor, and a memory access watch device, transient errors affecting memory in said at least two processing unit cores being detected and corrected by use of a detection and correction code stored in memory associated with a software scanning task, proper functioning of said microprocessor being verified via a segmentation of said memory that is associated with monitoring memory accesses that ensures said microprocessor has rights for accessing a current segment of said memory, said one or more memory segments allocated for using in saving a context;
   transmitting a correction demand signal to a control function for said at least two processing unit cores and input-output if a violation of said memory access rights is detected; and
   centralizing the following operations in the control function for said processing units and input-output of said processing units:
   accessibility to at least one clock generator, at least one timer and at least one watch;
   reception of said correction demand signal;
   macro-synchronization of different simultaneous executions of software;
   comparison of data generated by said different simultaneous executions of said software;

when an error is detected, decision-making in order to initialize a correction phase and transmission of a correction phase demand simultaneously to the different simultaneous executions of said software;
performance of input-output upon demands from said software; and
direct access to said memory in said at least two processing unit cores.

6. The method of claim 5, in which there is a confinement zone for errors between software tasks, in such a way that a faulty microprocessor can only disturb the variables of the current task but not those of the other tasks.

7. The method of claim 5, further comprising memorizing a context in a shared and centralized memory in said at least two processing unit cores, without needing any specific storage device, one or more memory zones involved in saving said context from each of one or more tasks capable of being differentiated, each of said one or more memory zones that are used for memorizing said context being controlled in a double "Old" and "New" bank, said double "Old" and "New" banks being made to work in flip-flop, said double banks capable of being flip-flopped by inverting a set of "Old" and "New" indexes, said one or more memory zones that are referenced by said "Old" indexes being authorized in reading whilst prohibiting them in writing.

8. The method of claim 7, in which error recovery based on a restoration of the preceding context is performed by noting that the index stating the preceding context deemed to be healthy is not changed, when it is systematically flip-flopped at the end of the period corresponding to the detection/recovery granularity when no error is detected.

9. The method of claim 5, in which an error detection/recovery granularity is the control/command cycle for each one of the software tasks being executed on the at least two processing unit cores, and in which a recovery may be only be performed on a faulty software task without the execution of the other tasks being affected by it.

10. The method of claim 5, in which an error detection comprises the microprocessor going into standby mode, thereby producing a "hole" in a period in the usual execution cycle.

11. The method of claim 5, in which said comparison is performed by the application software explicitly demanding a grouped comparison context data so as to save them only if they are deemed to be healthy, said demanding being made systematically at the end of the period corresponding to a detection/recovery granularity, or by, as their calculation progresses, said memory access watch device detects an attempt at writing in the context zones and systematically subjects it to a comparison to verify its veracity.

12. The method of claim 5, in which three error confinement zone levels are defined: spatial, temporal and software levels.

13. The method of claim 5, which is used in an onboard electronic system, in the space field, or both.

* * * * *